(12) United States Patent
Neumann et al.

(10) Patent No.: US 8,977,014 B2
(45) Date of Patent: Mar. 10, 2015

(54) METHODS FOR STIMULATING THE EFFECT OF DISTORTION ON REPRESENTATIONS OF MARKERS AND METHODS FOR ANALYZING REPRESENTATIONS OF MARKERS USING SIMULATIONS OF DISTORTION

(75) Inventors: Cedric Neumann, Birmingham (GB); Roberto Puch-Solis, Birmingham (GB)

(73) Assignee: Forensic Science Service Ltd., London (GB)

( * ) Notice: Subject to any disclaimer, the term of this patent is extended or adjusted under 35 U.S.C. 154(b) by 0 days.

(21) Appl. No.: 13/482,283

(22) Filed: May 29, 2012

(65) Prior Publication Data

US 2013/0034275 A1 Feb. 7, 2013

Related U.S. Application Data

(63) Continuation of application No. 12/980,780, filed on Dec. 29, 2010, now abandoned, which is a continuation of application No. 11/084,356, filed on Mar. 18, 2005, now abandoned.

(30) Foreign Application Priority Data

Oct. 26, 2004 (GB) .................................. 0423648.5
Feb. 11, 2005 (GB) .................................. 0502849.3

(51) Int. Cl.
*G06K 9/00* (2006.01)
*G06K 9/62* (2006.01)
*G06K 9/36* (2006.01)

(52) U.S. Cl.
CPC .......... *G06K 9/6255* (2013.01); *G06K 9/00006* (2013.01)
USPC ............................ 382/124; 382/216; 382/276

(58) Field of Classification Search
CPC ........................... G06K 2009/363; G06K 9/00
USPC ................................... 382/125, 124, 216, 276
See application file for complete search history.

(56) References Cited

U.S. PATENT DOCUMENTS

| | | | |
|---|---|---|---|
| 5,469,512 | A | 11/1995 | Fujita et al. |
| 6,487,662 | B1 | 11/2002 | Kharon et al. |

(Continued)

FOREIGN PATENT DOCUMENTS

| | | | |
|---|---|---|---|
| EP | 0 636 996 | A2 | 2/1995 |
| EP | 0 848 346 | A2 | 6/1998 |

(Continued)

OTHER PUBLICATIONS

Ross et al, "a deformazble model for fingerprint matching" the journbal of pattern recognition society, 38:95-103, 2005.*

(Continued)

*Primary Examiner* — Kathleen Y Dulaney
(74) *Attorney, Agent, or Firm* — Merchant & Gould P.C.

(57) ABSTRACT

A method of simulating the effect of distortion on a representation of a marker, such as a fingerprint is provided. The method is useful for generating data for use in various processes concerned with fingerprints and particularly avoids the need to manually generate and collect such data. The method includes obtaining a plurality of representations from an individual, the representations being subject to different distortions relative to one another. A function, such as a thin plate spline function, is then used to describe the effects of the different distortions on the plurality of representations obtained. This generic model of the effects of distortion can then be used to generate distortions for a further representation from an individual, preferably another individual. The simulated distorted representations can be used in a variety of ways.

7 Claims, 1 Drawing Sheet

(56) References Cited

U.S. PATENT DOCUMENTS

| | | | |
|---|---|---|---|
| 6,594,392 | B2 | 7/2003 | Santoni |
| 6,701,016 | B1 | 3/2004 | Jojic et al. |
| 6,836,554 | B1 | 12/2004 | Bolle et al. |
| 7,027,624 | B2 | 4/2006 | Monden |
| RE39,342 | E | 10/2006 | Starks et al. |
| 7,124,066 | B2 * | 10/2006 | Marschner et al. ............... 703/2 |
| 7,310,446 | B2 | 12/2007 | Kato et al. |
| 7,394,918 | B2 | 7/2008 | Mihara et al. |
| 7,397,933 | B2 | 7/2008 | Mihcak et al. |
| 7,512,255 | B2 | 3/2009 | Kakadiaris et al. |
| 7,680,312 | B2 | 3/2010 | Jolly et al. |
| 2003/0063782 | A1 | 4/2003 | Acharya et al. |
| 2004/0202355 | A1 | 10/2004 | Hillhouse |
| 2004/0218789 | A1 | 11/2004 | Polcha et al. |
| 2005/0047676 | A1 | 3/2005 | Kang et al. |
| 2005/0100243 | A1 | 5/2005 | Shum et al. |

FOREIGN PATENT DOCUMENTS

| | | |
|---|---|---|
| FR | 2 848 699 A1 | 6/2004 |
| WO | WO 02/097712 A2 | 12/2002 |
| WO | WO 03/085591 A1 | 10/2003 |

OTHER PUBLICATIONS

Maltoni, D. et al. "Handbook of Fingerprint Recognition," Springer Verlag, Jun. 2003, XP002366505 & XP002365424, ISBN: 0-387-95431-7.

Ross, A. et al. "Estimating Fingerprint Deformation," Proceedings of the International Conference on Biometric Authentication, 3072:249-255, Jul. 2004.

Ross, A. et al. "A deformable model for fingerprint matching," The Journal of Pattern Recognition Society, 38:95-103, 2005.

Bazen, A. et al. "Thin-Plate Spline Modelling of Elastic Deformations in Fingerprints," PROC. 3rd IEEE Benelux Signal Processing Symposium, S02-1-S02-4, Mar. 2002.

Ross, A. "Information Fusion in Fingerprint Authentication," Michigan State University, Department of Computer Science & Engineering, 2003.

Duda, R. et al. "Pattern Classification, Introduction," Wiley-Interscience, 1-19, 2001, XP002365512, ISBN: 0-471-05669-3.

Duda, R. et al. "Pattern Classification, Bayesian Decision Theory," Wiley-Interscience, 20-83, 2001, XP002365513, ISBN: 0-471-05669-3.

Bebis, G. et al. "Fingerprint Identification Using Delaunay Triangulation," Information Intelligence and Systems, Oct. 31, 1999, pp. 452-459.

* cited by examiner

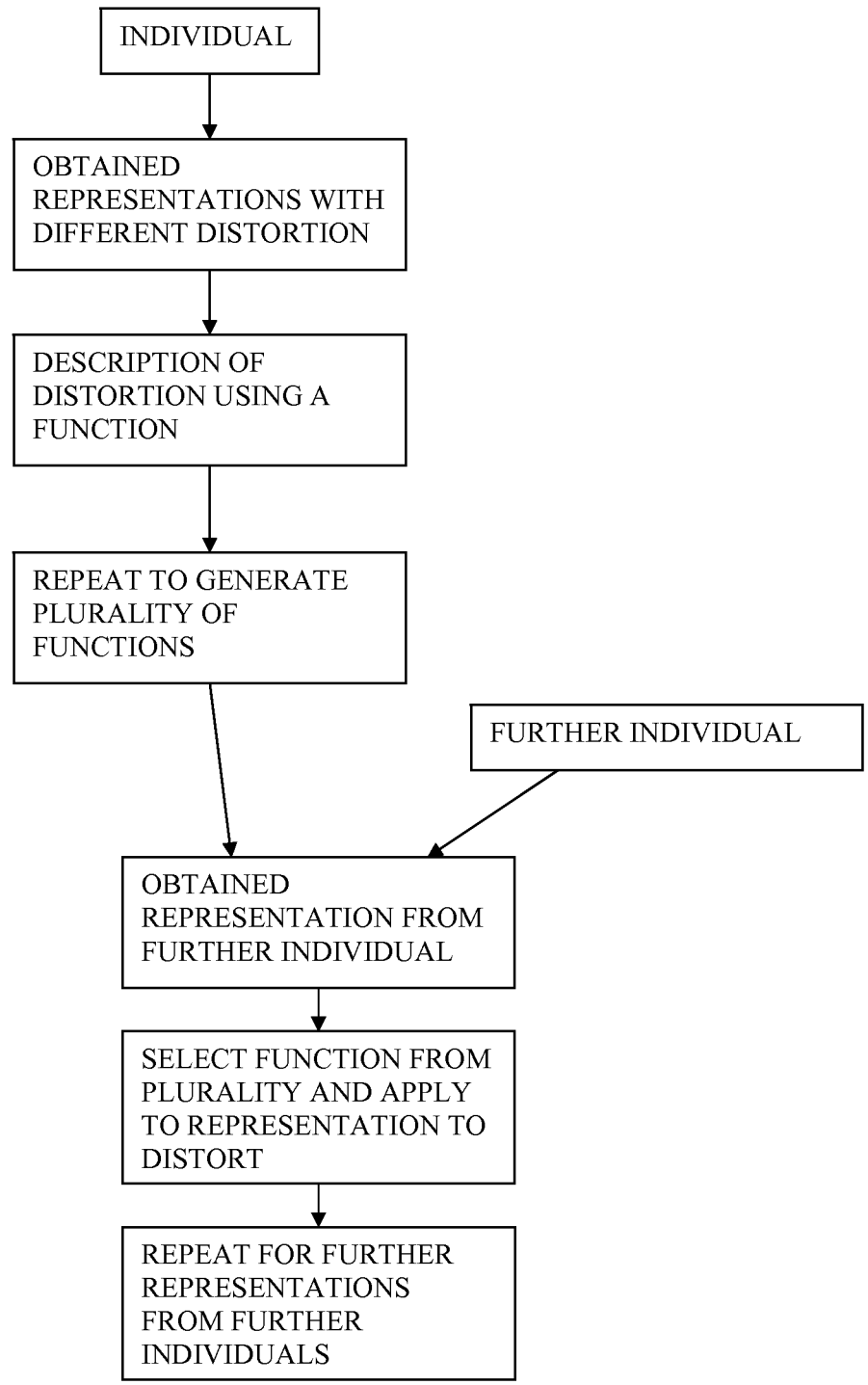

METHODS FOR STIMULATING THE EFFECT OF DISTORTION ON REPRESENTATIONS OF MARKERS AND METHODS FOR ANALYZING REPRESENTATIONS OF MARKERS USING SIMULATIONS OF DISTORTION

This application is a Continuation application of Ser. No. 12/980,780, filed 29 Dec. 2010, which is a Continuation application of Ser. No. 11/084,356, filed 18 Mar. 2005, which claims benefit of Ser. No. 0423648.5, filed 26 Oct. 2004 in the UK and Serial No. 0502849.3, filed 11 Feb. 2005 in the UK, and which applications are incorporated herein by reference. To the extent appropriate, a claim of priority is made to each of the above disclosed applications.

BACKGROUND OF THE INVENTION

This invention concerns improvements in and relating to comparisons, particularly, but not exclusively to comparisons of biometric markers and the accounting for distortion involved therein.

Various approaches for comparing a biometric marker, such as a fingerprint, from one source with one from another source exist. Some such systems have attempted to account on a case by case basis for the effects of distortion.

SUMMARY OF THE INVENTION

The applicant has developed a likelihood ratio based approach for such a comparison and this takes into account the variation in representations of the same finger taken under different conditions.

The present invention has amongst its aims to provide additional data for such a process, without undue burden in its generation.

BRIEF DESCRIPTION OF THE DRAWING

FIG. 1 shows a diagram of an exemplary method of simulating the effect of distortion on a representation of a marker.

DETAILED DESCRIPTION OF THE INVENTION

According to a first aspect of the invention we provide a method of simulating the effect of distortion on a representation of a marker, the method including obtaining a plurality of representations from an individual, the representations being subject to different distortions relative to one another;

describing the effect of the different distortions on the plurality of representations using a function;

taking a further representation from an individual and preferably another individual, applying the function to that representation to generate one or more simulated distorted representations.

According to a second aspect of the invention we provide a method of forming a data set including distorted representations of a marker, the method including obtaining a plurality of representations from an individual, the representations being subject to different distortions relative to one another;

describing the effect of the different distortions on the plurality of representations using a function;

taking a further representation from an individual, preferably another individual, applying the function to that representation to generate one or more simulated distorted representations;

adding the one or more simulated distorted representations to a data set.

The first and/or second aspects of the invention may include any of the features, options or possibilities set out elsewhere in this application, including from amongst the following.

The distortion may arise from one or more factors. The factors may be or include the particular finger and/or the particular hand from which the representation arises. The factor may be or include the gender and/or profession and/or height and/or size and/or weight and/or age of the person from whom the representation arises. The factor may be the type and/or material and/or shape of the substrate on which the representation arose.

The marker, preferably a biometric marker, may be a fingerprint, but may be a palm print, ear print, footprint, footwear print or the like.

The plurality of representations may be obtained from the individual under controlled conditions. The conditions may be controlled in terms of the finger used and/or substrate used and/or pressure used and/or extent of distortion used. Preferably one or more repeats of each representation are obtained. Preferably at least 2 repeats and more preferably at least 5 repeats are obtained for each of the different distortions. Preferably at least 5 representations with different distortions are obtained from each individual. Preferably a plurality of representations are obtained from a plurality of individuals. Preferably at least 20 individuals are used, more preferably at least 40.

The function may be or include a non-linear function. The function may be a non-linear transformation. The function may be or include one or more matrices. The function may be defined, at least in part, by a comparison of a pair of the representations having different distortions. The comparison may consider the position of one or more minutiae in each of the representations and/or consider the position of one or more points on one or more ridges. The function may be defined, at least in part, by a thin plate spline approach.

Preferably the method is applied to a plurality of different individuals to provide a plurality of functions. One or more of the functions may be used to generate the simulated distorted representations. One or more of the functions may be combined, for instance to give a composite function. One or more of the functions may be combined to give a general description of distortion. The composite function may be a composite matrix. The plurality of functions and/or composite function and/or composite matrix may be used to generate one or more simulated distorted representations from a further representation.

The further representation to which the function is applied is preferably an undistorted representation. The representation to which the function is applied may be from a different individual to the individual or individuals that the distorted representations are obtained from. Preferably a plurality of simulated distorted representations are obtained from each representation, potentially nine or more, preferably 10 or more, ideally 25 or more. The function may be used to generate one or more simulated distorted representations for a plurality of individuals, ideally with the same function being used in for each individual.

Preferably the simulated distorted representations are supplied to a data set, ideally a data base. Preferably the data set and/or data base is used in a comparison method, particularly a comparison method in which a representation being compared is considered against within finger variability and/or between finger variability. The data set and/or data base may be used to form a probability distribution, for instance a probability distribution related to the distance between different representations of the same marker and/or a probability distribution related to the distance between different representations of different markers.

The method may be repeated for one or more different types and/or direction of distortion. The one or more different types of distortion may include: distortion of and/or towards one end, for instance a top, of a representation; and/or distortion of and/or towards another end, for instance a bottom, of a representation; and/or distortion of and/or towards another end, for instance one side, of a representation; and/or distortion of and/or towards another end, for instance another side, of a representation.

One or more functions may be provided. One or more functions related to or specific to the finger which was the source of the representation may be used, for instance where the finger is the thumb, first finger, index finger, third finger or fourth finger. One or more functions related to or specific to the hand which was the source of the representation may be used, for instance where the hand is the right hand or left hand. One or more functions related to or specific to the gender of the person who was the source of the representation may be used, for instance where the gender is male or female. One or more functions related to or specific to the size of the person who was the source of the representation may be used, for instance in respect of one or more hyped ranges for the person. One or more functions related to or specific to the age of the person who was the source of the representation may be used, for instance with respect to one or more age ranges. One or more functions related to or specific to the weight of the person who was the source of the representation may be used, for instance with respect to one or more weight ranges. One or more functions related to or specific to the profession of the person who was the source of the representation may be used.

Various embodiments of the present invention will now be described, by way of example only.

The comparison of fingerprints, or other biometric markers, obtained from one source with those obtained from another source is useful for a variety of purposes, including in forensic science. In the forensic science context, the comparison may seek to suggest that a representation of a finger mark from a crime scene is linked to a suspect.

The applicant has conducted research and developed an approach which seeks to evaluate the strength of the link between a crime scene representation of a fingerprint and a representation of a fingerprint taken from a suspect and to present this evidence using a likelihood approach. A significant issue in this approach and in other approaches to the consideration of representations of fingerprints is the issue of distortion.

Whilst a suspect's print taken in a controlled manner, using preferred materials, is fairly consistent in terms of the representation it gives between occasions, this is not the case in crime scene cases. Representations of fingerprints left during day to day activities, including those which are then associated with a crime, arise under a wide variety of conditions. The pressure applied, movement during application, the substrate involved and a variety of other factors can all alter the form of the representation which arises when compared with others left or with representations taken under controlled conditions.

In the approach taken by the applicant, detailed in applicant's UK patent application number GB0422784.9 filed 14 Oct. 2004 and/or UK patent application number GB 0502900.4 filed 11 Feb. 2005, the representations of interest are considered in the context of two data sets. A data set representative of the variation in representations of fingerprints across the population (say based on 2000 fingerprints) and a data set representative of the variation in representations of the same fingerprint with specific distortion are used. The existing data set representative of the variation in the representations of the same fingerprint with distortion has been compiled by taking a fingerprint from a small number of individuals (say 4) and obtaining a number of representations for them under a number of specific different conditions (say 9) with a number of repeats for each (say 5). In order to ensure that the different individuals are considered under the same variations in conditions, an extremely time consuming and rigorous procedure is followed. In practical terms this limits the number of different individuals and number of different conditions for each which can be considered.

Instead of physically sampling a large number of individuals, under various conditions and with repeats thereof, the alternative approach of the present invention simulates a large number of specific distorted representations from an undistorted representation. The undistorted representation is easy to collect or could even be obtained from one of a number of existing data sets of such representations. The actual generation of the specific distorted representations is performed by a computer and so is quick to perform on a large scale. The simulation is repeated on a large number of undistorted representations.

Using such an approach, the data set representative of the variation in representations of the same fingerprint with distortion can be increased substantially in size with only a reasonable input effort. This means that the approach and statistical models which use this data set are more robust as a result, as more extensive testing and validation is possible. An additional benefit comes from the approach enabling the creation of very large data sets of distorted representations without the need for physical sampling. A powerful research resource results.

To be able to distort undistorted representations in an appropriate way, it is necessary to derive an appropriate description of the distortion process. To do this, the approach involves an initial investment in further physical representations of distortion. A significant number of individuals, for instance 40, are used to provide a significant number of distorted representations of their fingerprints, for instance 50 each. For each individual, their representations and the distortion of them are then described using a non-linear mathematical transformation. Such an approach is more accurate than some prior approaches as the nature of the distortion itself is non-linear. In the preferred form the approach establishes a matrix which describes the distortion. An example of such a matrix description of distortion is to be found in Ross et al., *Proceedings of the International Conference on Biometric Authentication (ICBA)* Hong Kong, July 2004 "*Estimating Fingerprint Deformation*" the contents of which are incorporated herein by reference.

Starting with a pair of representations, these are presented in a black and white format, preferably skeletonised and subjected to appropriate cleaning and healing of the representation. The minutiae locations are then determined and information on them collected for each representation using a suitable information format. The location in the representation and orientation of the associated ridge and grayscale intensity of pixels in the vicinity may be captured in this way. The degree of correspondence between minutiae in the two representations can then be obtained and quantified using one or more techniques, such as an elastic stringer matcher. Ridge curves can be extended from these points and the degree of correspondence between points on the curves established too.

The global effect of different distortions between the different representations on these points is then considered. The Thin Plate Spline approach describes the dependence of point positions on a thin metal plate with the physical bending energy applied to the thin metal plate. The Thin Plate Spline approach is a parametric generalisation from rigid to mild non-rigid deformations. The parameters of the Thin Plate Spline approach can be obtained from a matrix equation and various approaches to the solution of the equation can be taken. An average deformation model can be obtained from the technique.

In the Ross et al., paper, a number of representations of a marker of a particular individual are taken. These are taken under generally similar but uncontrolled conditions and so reflect the common extent of variation for that marker of that individual. The results are used to form the average deformation model for that individual. The average deformation model can be considered as modelling the behaviour of the individual. The average deformation model is used to distort the representation or "baseline impression" of a particular individual before that is compared with the other, template representation of a particular individual. As a result, the comparison process is improved. No use of the distorted representation is made outside of the one representation versus another representation comparison for a particular individual. If another individual is to be considered, then representations must be collected for him, an average deformation model for that individual must be generated and that individual's own average deformation model is used in any comparison. Each model is individual specific, therefore, and the model for one individual may be very different to the model for another.

In contrast, the present approach uses the description of specific distortion provided by the matrix and takes it in an alternative direction. Firstly, it differs in terms of the end use as that is to take undistorted representations, which are not involved in any authentication process, and deliberately convert them to distorted representations. These representations are then used together with other such distorted representations to form a data-set, and ideally to contribute to or validate the data set or probability distribution used in the technique of GB0422784.9 filed 14 Oct. 2004 and/or GB0502900.4 filed 11 Feb. 2005. This is a use and interest not involved in the Ross et al., process. Secondly, the approach differs because the matrix arrived at for specific distortion of an individual is considered together with the matrices arrived at from corresponding distortions of a number of other individuals so as to provide a composite matrix descriptive of distortion in a more general sense. The model of deformation is not specific to an individual, therefore, but instead is applicable between individuals. The modelling of distortion according to the invention can address distortion as a whole, but more preferably a number of different models to cover different directions of distortion are generated. For instance, a model for distortion of the top of the representation can be determined and/or a model for distortion to one side and/or another and/or the bottom can be determined. The models can be used individually and/or together.

The composite matrix which results provides a detailed and appropriate expression of how specific distortion alters representations in general. As such, it is then possible to take an undistorted representation from an individual, who has not provided distorted representations which have been physically collected and considered, and simulate a series of distorted representations for that representation. Repeat uses of the distortion matrix gives repeat distorted representations. All these are useful in terms of contributions to the data set on between representation variability for the same finger and/or person. The approach can equally well be applied to a set of ten representations collected with one representation for each finger of the person.

Whilst a number of non-linear mathematical transformations are possible, and a number of matrix based approaches are possible, the preferred matrix form is achieved using a Thin Plate Spline approach referenced above. Many variations on that particular way of describing the distortion are possible, however.

Whilst the approach is described above in the context of one, preferably composite, matrix, it is possible to develop a range of such matrices which are expressions of distortion under various conditions. Thus a matrix for each gender and/or hand possible for the person from whom the representation arises is possible. A series of matrices, with individual matrices for different ages of the person from whom the representation arises, is possible. A series of matrices, with individual matrices for different weights of the person from whom the representation arises, is possible. A series of matrices, with individual matrices for different professions of the person from whom the representation arises, is possible.

By way of validation, it is possible to take one or more representations under controlled conditions and apply the distortion matrix to them. The resulting distorted representations can then be compared with real representations obtained under a variety of conditions and hence subject to distortion of their own.

The invention claimed is:

1. A method of simulating the effect of distortion on a representation of a biometric marker, the method including:
    a) obtaining a plurality of representations from an individual of a biometric marker, the representations being subject to different distortions relative to one another;
    b) representing the effect of the different distortions on the plurality of representations using a function, the function being defined, at least in part, by a comparison of a pair of the representations having different distortions;
    c) repeating steps a) and b) for a plurality of individuals to provide a plurality of functions;
    d) combining the plurality of functions to give a composite function;
    e) taking a further representation of a biometric marker from the individual or another individual, applying the composite function to the further representation to generate one or more simulated distorted representations; and
    f) repeating step e) to generate one or more simulated distorted representations for a plurality of individuals.

2. A method according to claim 1 in which the representations include one or more minutiae and/or one or more points on one or more ridges and the comparison considers the position of one or more minutiae in each of the representations and/or considers the position of one or more points on one or more ridges.

3. A method according to claim 1 in which the plurality of representations are obtained from the individual under controlled conditions and in which a finger provides the biometric marker for which the plurality of representations are obtained from the individual and the conditions are controlled in terms of the finger used and/or substrate used and/or pressure used and/or extent of distortion used.

4. A method according to claim 1 in which one or more repeats of each representation are obtained.

5. A method according to claim 1 in which a plurality of representations are obtained from a plurality of individuals.

6. A method according to claim 1 in which the further representation to which the function is applied is an undistorted representation.

7. A method according to claim 1 in which the further representation from another individual.

\* \* \* \* \*